United States Patent
Varga et al.

(10) Patent No.: US 9,832,626 B2
(45) Date of Patent: Nov. 28, 2017

(54) METHOD AND APPARATUS FOR MAINTAINING A REGISTRATION FOR AN EMERGENCY SERVICE

(75) Inventors: Jozsef Varga, Nagydobsza (HU); Jiadong Shen, Munich (DE); Peter Leis, Penzberg (DE); Ulrich Wiehe, Bad Hersfeld (DE)

(73) Assignee: Nokia Solutions and Networks Oy, Espoo (FI)

( * ) Notice: Subject to any disclaimer, the term of this patent is extended or adjusted under 35 U.S.C. 154(b) by 321 days.

(21) Appl. No.: 13/877,407

(22) PCT Filed: Feb. 7, 2012

(86) PCT No.: PCT/EP2012/051989
§ 371 (c)(1),
(2), (4) Date: Apr. 2, 2013

(87) PCT Pub. No.: WO2012/110350
PCT Pub. Date: Aug. 23, 2012

(65) Prior Publication Data
US 2013/0201879 A1    Aug. 8, 2013

(30) Foreign Application Priority Data
Feb. 16, 2011 (WO) ............... PCT/EP2011/052292

(51) Int. Cl.
*H04W 4/22* (2009.01)
*H04L 29/06* (2006.01)
(Continued)

(52) U.S. Cl.
CPC ............ *H04W 4/22* (2013.01); *H04L 61/256* (2013.01); *H04L 61/2553* (2013.01);
(Continued)

(58) Field of Classification Search
None
See application file for complete search history.

(56) References Cited

U.S. PATENT DOCUMENTS

2006/0178132 A1* 8/2006 Tammi ................ H04L 63/10
455/411
2008/0089486 A1* 4/2008 Madour .............. H04L 65/40
379/45

(Continued)

FOREIGN PATENT DOCUMENTS

| CN | 101060704 A | 10/2007 |
|---|---|---|
| CN | 101155347 A | 4/2008 |
| EP | 2297985 A2 | 3/2011 |

OTHER PUBLICATIONS

C1-082874, 3GPP TSG CT WG1 Meeting #55, Budapest Hungary, Aug. 18-22, 2008, "S-CSCF handling of emergency registration", Alcatel-Lucent, 4 pgs.*

(Continued)

*Primary Examiner* — Charles C Jiang
*Assistant Examiner* — George Atkins, Jr.
(74) *Attorney, Agent, or Firm* — Harrington & Smith

(57) ABSTRACT

The invention relates to a session control entity, subscription entity, methods and computer programs for transmitting a request to terminate a registration of a user, determining if the user is registered for an emergency service, for maintaining the user registered for the emergency service, if based on the determination the user is registered for the emergency service, and transmitting an indication indicating that the user is registered for an emergency service if based on the determination the user is registered for the emergency service.

12 Claims, 2 Drawing Sheets

(51) Int. Cl.
  *H04L 29/12* (2006.01)
  *H04W 76/00* (2009.01)
  *H04W 60/06* (2009.01)

(52) U.S. Cl.
  CPC ...... *H04L 65/1016* (2013.01); *H04L 65/1046* (2013.01); *H04L 65/1073* (2013.01); *H04L 65/1096* (2013.01); *H04L 61/1588* (2013.01); *H04L 61/203* (2013.01); *H04L 61/3095* (2013.01); *H04W 60/06* (2013.01); *H04W 76/007* (2013.01)

(56) References Cited

U.S. PATENT DOCUMENTS

| | | | | |
|---|---|---|---|---|
| 2008/0271113 | A1* | 10/2008 | Belling | H04L 63/20 726/1 |
| 2009/0022298 | A1* | 1/2009 | Qiu | H04L 47/125 379/211.01 |
| 2009/0186599 | A1* | 7/2009 | Cipoletti | H04W 4/24 455/406 |
| 2010/0115110 | A1* | 5/2010 | Hao | H04W 76/007 709/228 |
| 2010/0124897 | A1* | 5/2010 | Edge | H04M 7/123 455/404.1 |
| 2011/0058658 | A1* | 3/2011 | Li | H04W 4/22 379/45 |
| 2011/0117876 | A1* | 5/2011 | Xu | H04W 4/22 455/404.1 |
| 2012/0134323 | A1* | 5/2012 | Perkuhn | H04W 8/06 370/328 |

OTHER PUBLICATIONS

C1-082874, 3GPP TSC CT WG1 Meeting #55, Budapest, Hungary, Aug. 18-22, 2008, "S-CSCF Handling of Emergency Registration", Alcatel-Lucent, 4 pgs.*

3GPP TS29.228 V8.11.1 (Feb. 2011), "3$^{rd}$ Generation Partnership Project; Technical Specification Group core network and Terminals; IP Multimedia (IM) Subsystem Cx and Dx interfaces; Signalling flows and message contents (Release 8)", 68 pgs.

3GPP TS 29.229 (V9.3.0 (Sep. 2010) "3$^{rd}$ Generation Partnership Project; Technical Specification Group Core Network and Terminals Cx and Dx interfaces based on the Diameter protocol; Protocol details (Release 9)", 36 pgs.

3GPP TS29.230 V9.5.0 (Dec. 2010), "3$^{rd}$ Generation Partnership Project; Technical Specification Group Core Network and Terminals; Diameter applications; 3GPP specific codes and identifiers (Release 9)", 27 pgs.

3GPP TS23.167 V9.5.0 (Dec. 2010), "3$^{rd}$ Generation Partnership Project; Technical Specification Group Services and System Aspects; IP Multimedia Subsystem (IMS) emergency sessions (Release 9)", 39 pgs.

C1-082874, 3GPP TSG CT WG1 Meeting #55, Budapest, Hungary, Aug. 18-22, 2008, "S-CSCF handling of emergency registration", Alcatel-Lucent, 4 pgs.

Tdoc N1-050221, 3GPP TSG-CN1 Meeting #37, Sydney, Australia, Feb. 14-18, 2004, "Filter criteria matching and generation of third-party REGISTER request for network-initiated deregistration", Lucent Technologies, 4 pgs.

* cited by examiner

METHOD AND APPARATUS FOR MAINTAINING A REGISTRATION FOR AN EMERGENCY SERVICE

TECHNICAL FIELD OF THE INVENTION

The present invention relates to a mechanism for registration. In particular, the present invention is related to a method and apparatus for maintaining a user registered for an emergency service.

BACKGROUND OF THE INVENTION

Within the IP (Internet Protocol) Multimedia Subsystem (IMS) as defined by $3^{rd}$ Generation Partnership Project (3GPP) Session Initiation Protocol (SIP) defined by Internet Engineering Task Force (IETF) is used for controlling communication. SIP is an application-layer control protocol for creating, modifying, and terminating sessions with one or more participants. These sessions may include Internet multimedia conferences, Internet telephone calls, and multimedia distribution. Members in a session can communicate via multicast or via a mesh of unicast relations, or a combination of these. Session Description Protocol (SDP) is a protocol which conveys information about media streams in multi-media sessions to allow the recipients of a session description to participate in the session. The SDP offers and answers can be carried in SIP messages. Diameter protocol has been defined by IETF and is intended to provide an Authentication, Authorization and Accounting (AAA) framework for applications such as network access or IP mobility.

Generally, for properly establishing and handling a communication connection between network elements such as a user equipment and another communication equipment or user equipment, a database, a server, etc., one or more intermediate network elements such as control network elements, support nodes, service nodes and interworking elements are involved which may belong to different communication networks.

Also procedures for IMS emergency services have been defined by the 3GPP. Emergency call is an example of emergency services. Before establishing an IMS emergency session, user equipment (UE) must attach to the IP connectivity access network (IP-CAN) and, if required by local regulations, must be registered to the IMS. However, an IMS emergency registration cannot be distinguished in a home subscriber server (HSS) from a normal IMS registration.

SUMMARY OF THE INVENTION

The present invention overcomes above drawbacks by providing an apparatus, a method and a computer program product comprising receiving a request to terminate a registration of a user, determining if the user is registered for an emergency service, maintaining the user registered for the emergency service, if based on the determination the user is registered for the emergency service, and transmitting an indication indicating that the user is registered for an emergency service if based on the determination the user is registered for the emergency service.

The apparatus, method and computer program product can comprise terminating at least one registration relating to the user, wherein the at least one registration does not comprise a registration for an emergency service.

The user can comprise or can be identified with a user identity and/or a public identity and/or an IMPU.

The indication can be transmitted:
responsive to the request, and/or,
in a rejection, and/or,
in a response, and/or,
according to diameter protocol, and/or
in Registration-Termination-Answer message (RTA).

The indication can comprise an experimental result code of an internet protocol multimedia subsystem (IMS).

The request can comprise:
a request received from a subscription entity, and/or,
a de-registration, and/or,
network initiated de-registration.

Further, an apparatus, a method and a computer program are provided for transmitting a request to terminate a registration of a user, receiving an indication indicating that the user is registered for an emergency service, and, maintaining the registration of the user active based on the received indication.

The indication can be received:
responsive to the request, and/or,
in a rejection, and/or,
in a response, and/or,
according to diameter protocol, and/or
in Registration-Termination-Answer message (RTA).

Embodiments of the present invention may have one or more of following advantages:
An HSS is made aware of active emergency registration of a user.
An active emergency registration of a user can be kept alive, even when terminating normal registration of the user.
Enable a call back from an emergency centre to succeed.

DETAILED DESCRIPTION OF THE INVENTION

Figure 1:
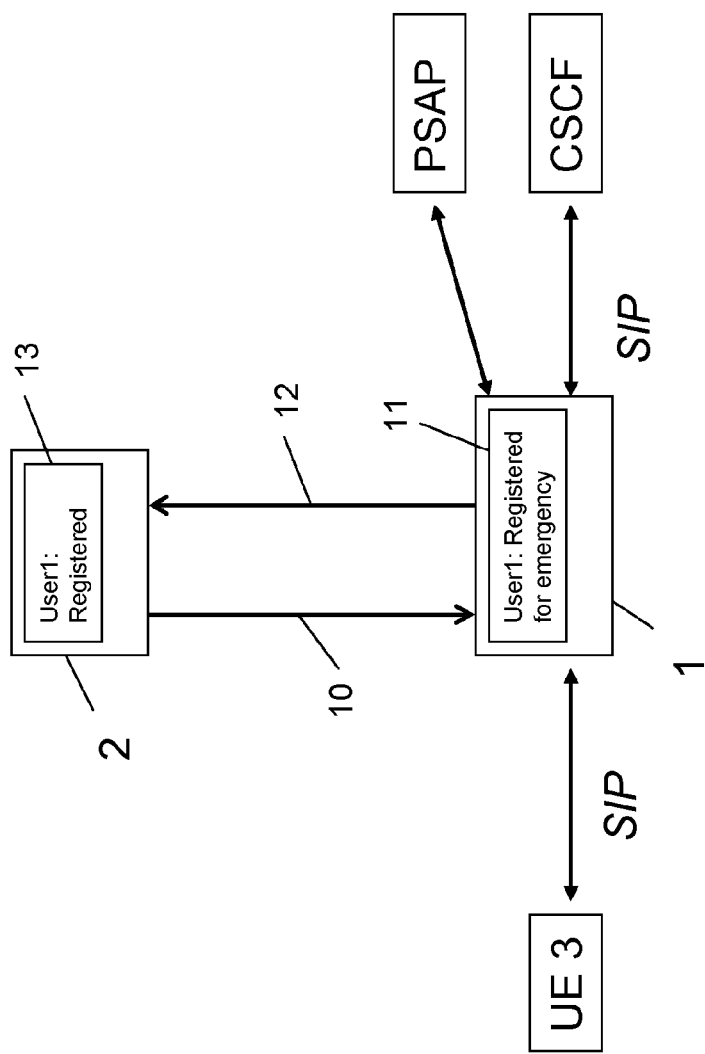
FIG. 1 illustrates signalling and interfaces between relevant network elements according to aspects of the invention.

Different types of network entities and functions exist in the IMS network. Call Session Control Functions (CSCF) implement a session control function in SIP layer. The CSCF can act as Proxy CSCF (P-CSCF), Serving CSCF (S-CSCF) or Interrogating CSCF (I-CSCF). The P-CSCF is the first contact point for the User Equipment (UE) within the IMS; the S-CSCF handles the session states in the network; the I-CSCF is mainly the contact point within an operator's network for all IMS connections destined to a subscriber of that network operator, or a roaming subscriber currently located within that network operator's service area.

The functions performed by the I-CSCF are, for example, assigning an S-CSCF to a user performing a SIP registration and routing SIP requests received from another network towards the S-CSCF. The S-CSCF can perform the session control services for the UE. It maintains a session state as needed by the network operator for support of the services and may be acting as Registrar, i.e. it accepts registration requests and makes its information available through the location server (e.g. HSS). The S-CSCF is the central point to users that are hosted by this S-CSCF. The S-CSCF can provide services to registered and unregistered users when it is assigned to these users. This assignment can be stored in the Home Subscriber Server (HSS).

The HSS is the master database for a given user. It is the entity containing the subscription-related information to support the network entities actually handling calls/sessions. As an example, the HSS provides support to the call control servers (CSCFs) in order to complete the routing/roaming procedures by solving authentication, authorisation, naming/addressing resolution, location dependencies, etc.

The HSS can be responsible for holding the following user related information:
  User identification, numbering and addressing information, including a display name.
  User security information: Network access control information for authentication and authorization, such as password information
  User Location information at inter-system level: the HSS supports the user registration, and stores inter-system location information, etc.
  User profile information.

An IMS public user identity (IMPU) is a user identity that is used by any user for requesting communications with other users. The IMPU can take the form of a SIP uniform resource identifier (URI) or an E.164 number. Every IMS subsystem subscriber has one or more public user identities. At least one public user identity can be stored in the IM services identity module (ISIM). UE can receive more public identities from the IMS, where they can be stored in the HSS.

IMS private user identity (IMPI) is a user identity that is assigned by the home network operator and used, for example, for registration, authorisation, administration, and accounting purposes. The IMPI can be stored in ISIM and the IMPI can be derived from the international mobile subscriber identity (IMSI).

In an IMS registration with a CSCF, user equipment (UE) registers itself to a CSCF for a specific time, and the CSCF becomes the UE's serving CSCF (S-CSCF). The time for which the UE is registered in the CSCF is called registration lifetime. For the registration lifetime a binding can be created between the Contact address (IP address) of the UE and the public user identities of the user (both can be provided in the registration request).

De-registration is a process in which UE ends its current registration to the serving call state control function (S-CSCF). De-registration is actually a registration where the registration lifetime is set to 0.

Network initiated de-registration is a process in which a network element, for example, an S-CSCF or a HSS initiates de-registration of the user.

Registration-Termination-Request (RTR) message is a Diameter command message that a Diameter multimedia server sends to a Diameter multimedia client to request the de-registration of a user. Registration-Termination-Answer (RTA) message is a Diameter command message that a client sends as a response to a previously received Registration-Termination-Request message.

Cx reference point or Cx interface is an interface between a CSCF and a HSS, supporting the transfer of data between them. The Cx reference point is based on the diameter protocol with 3GPP standard diameter applications. Sh interface is a corresponding interface between the HSS and an AS. Diameter is an authentication, authorisation, and accounting (AAA) protocol defined by the IETF and used for network access services, such as dial-up and mobile IP. The Diameter base protocol is evolved from the remote authentication dial-in user service (RADIUS) protocol.

Diameter multimedia client and Diameter multimedia server implement the Diameter multimedia application. The client is one of the communicating Diameter peers that usually initiates transactions. Examples of communication elements that may implement the Diameter multimedia client are the I-CSCF and S-CSCF. An example of a Diameter multimedia server is the HSS.

Attribute-value pair (AVP) is a generic pair of values that consists of an attribute header and the corresponding value. The AVP can be used, for example, to encapsulate protocol-specific data such as routing information, as well as authentication, authorisation, or accounting information. Diameter messages can contain AVPs to transmit information between an CSCF and the HSS.

Emergency registration is a special registration that relates to binding of a public user identity to a contact address used for emergency service. The contact address can be embedded in SIP Contact header. Emergency service related requests can obtain priority over normal requests in the IMS.

The IMS registration request can include an emergency indication. The implicit registration set of the emergency Public User Identifier can contain an associated TEL URI that is used to call back the user from the PSTN. After registration, the UE can initiate an IMS emergency session establishment using the IMS session establishment procedures containing an emergency session indication and any registered Public User Identifier.

Public safety answering point (PSAP) is a network element for emergency services that is responsible for answering emergency calls and can perform call back to a user which has previously called the PSAP. However, the call back can succeed only if the user is still registered at the time the call back is performed.

It would be beneficial not to de-register a user which is currently emergency registered to the network, to support emergency call back function. Currently it is not defined what the S-CSCF can do when a registration termination request (RTR) is received from the HSS, if the affected user is emergency registered (and optionally has a normal registration in parallel).

Currently no procedures or response codes have been defined how the S-CSCF can either reject the HSS initiated registration termination in this case, or indicate to HSS that the normal registration is terminated but the user has emergency registration and thus the HSS must keep the user's status as registered and keep the S-CSCF name as well (both necessary to enable emergency call back).

According to an aspect of the invention (shown in FIG. 1), when a session control entity 1 (S-CSCF) receives a registration termination request 10 (for example, an RTR message) relating to a user (e.g. user1 of UE 3), the S-CSCF 1 can reject the RTR and can transmit an indication (for example a response code) in a response message 12 (for example, an RTA) so that the HSS 2 can become aware of that:
  normal registration(s) associated with the affected user (e.g. user 1) are terminated, and/or
  the user (e.g. user 1) has active emergency registration which is to be kept.

According to an aspect of the invention, as a result of receiving the response 12, the HSS 2 can keep the user's status as registered and may not delete the S-CSCF name as the registrar of the user (and thus enabling emergency call back).

According to another aspect of the invention, when a session control entity 1 (S-CSCF) receives a registration termination request 10 (for example, an RTR message) for a user (user1 of UE 3), the S-CSCF 1 can accept the RTR (i.e. is not rejecting it), but can indicate within the response 12 that the deregistered user still has an emergency registration. When receiving this response 12, the HSS 2 can keep the user's status as registered and keep the S-CSCF name as assigned S-CSCF for the user.

Two solutions have been described, the difference is whether the response is considered as a reject with a special response code or an accept with additional indication.

The rejection with a special response code can have an advantage that even an HSS from an earlier release (not implementing aspects of the invention) will keep the registration status of the user.

The registration termination request can be a de-registration, for example a network (HSS) initiated de-registration and can happen over Cx interface. The registration termination request can contain user identities (user identity, public identity IMPU) which registration is to be terminated. An IMPU can be registered with an IMPI. Hence, via an RTR can one or more IMPU/IMPI pairs be de-registered.

Figure 2:
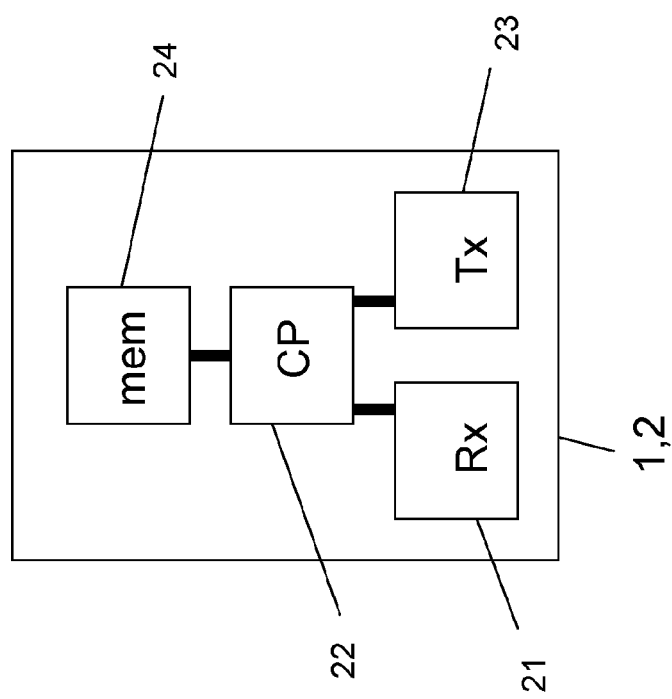
FIG. 2 illustrates examples of internal structure and functions of apparatuses implementing aspects of the invention.

FIG. 2 illustrates examples of internal structure and functions of apparatuses implementing aspects of the invention. The apparatus (S-CSCF1, HSS 2) can have a receiving unit 21 (receiver) configured to receive signaling messages, for example, Diameter messages (RTA, RTA). The receiving unit 21 can be configured to extract from a received message an indication indicating that a user (user identity, public identity, IMPU) to which the message relates to has an active registration to an emergency service. A processing unit 22 (processor) can be configured to handle received messages and, for example, to determine status of various registrations of the user, for example, to determine if the user has an active emergency registration. The processing unit 22 can interface a memory unit 24 (memory) which can be configured to maintain information of users, user identities (IMPUs), registration states, etc. A transmitting unit 23 (transmitter) can be configured to transmit signaling messages, for example, Diameter messages (RTA, RTA). The processing unit 22 can be configured to include an indication in a message to be transmitted by the transmitting unit 23. The indication can be a result code or other indication indicating that the user (user identity, public identity, IMPU) to which the message relates to is having an active registration to an emergency service.

The apparatus can be, for example, a subscription entity (HSS 2) or a session control entity (S-CSCF 1).

All units described above in relation to FIG. 2 may be implemented for example using microprocessors, chips and/or other electrical components and/or by software.

According to an aspect of the invention, it can be forbidden to deregister an emergency registration. The procedures in 3GPP describe on SIP level how to deregister a normal registration for the HSS initiated deregistration case. For emergency registration no SIP procedure is needed, but the HSS must be aware that the emergency registration is there, as to a route terminating PSAP call back using the emergency registration, it is necessary in the HSS to keep the user registered and assigned to the S-CSCF.

According to an aspect of the invention, an S-CSCF must reject the HSS initiated registration termination if the to-be-deregistered user identity has an emergency registration. For normal registration (non-emergency registration) the S-CSCF can still perform deregistration procedures as usual.

Without implementing aspects of the invention, the S-CSCF cannot indicate to the HSS that an emergency registration must be kept alive, thus if the HSS attempts HSS initiated deregistration for the emergency registered user identity, then a later PSAP call back will fail.

According to an aspect of the invention, in case of network initiated de-registration by the HSS, the HSS can change the state of the Public Identities to "Not Registered" and send a notification to the S-CSCF indicating the identities that shall be de-registered. The procedure invoked by the HS S, can correspond to the functional level operation Cx-Deregister. For emergency registered Public Identities the S-CSCF can reject the network initiated de-registration by returning an experimental result code, for example "DIAMETER_ERROR_EMERGENCY_REGISTRATION". In this case, the HSS shall keep the registration and shall not change the registration state.

According to an aspect of the invention, if the emergency registered Public Identity (IMPU) has normal registration as well, then for the normal registration the S-CSCF can perform the detailed de-registration procedures for each reason code as described in the 3GPP procedures.

According to an aspect of the invention, a new result code can be introduced, for example in Table 8.1.4 of 3GPP specification 29.230, which describes 3GPP specific Permanent Failure result codes:

EXPERIMENTAL

Result Code: Result text:
5xxx DIAMETER_ERROR_EMERGENCY_REGISTRATION

The result code can be used when a network initiated de-registration from the HSS is rejected by the S-CSCF because the user is emergency registered.

According to an aspect of the invention, an S-CSCF keeps the user's registration status unchanged for an emergency service, when a network initiated de-registration occurs.

A session control entity and subscription entity may be physically implemented in a switch, router, server or other hardware platform or electronic equipment which can support data transmission and processing tasks, or can be implemented as a component of other existing device.

For the purpose of the present invention as described herein above, it should be noted that an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention implies also wirebound technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable access networks may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user or subscriber may experience services from an access network, such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules therefor), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The invention is not limited to registration handling in the IMS network(s), but may also be applied in other type of networks having similar kind of session control entity and subscription entity roles and where emergency registration should be maintained active and not de-registered by the network. Functions of the gateway entity and session control entity described above may be implemented by code means, as software, and loaded into memory of a computer.

The invention claimed is:

1. A session control entity, comprising:
at least one processor; and
at least one memory including computer program code, where the at least one memory and the computer program code are configured, with the at least one processor, to cause the session control entity to at least:
receive from a subscription entity a request to terminate a registration of a user, wherein the request comprises user identities;
based on the user identities, determine a status of various registrations of the user, comprising determining that the various registrations of the user include that the user is registered for an emergency service;
not terminating the registration of the user for the emergency service;
terminate at least one registration relating to the user, wherein the at least one registration does not comprise the registration for the emergency service, and transmit an indication to the subscription entity indicating that the user is registered for an emergency service based on the determination the user is registered for the emergency service, wherein the indication comprises an experimental result code of an internet protocol multimedia subsystem to indicate that the request to terminate the registration of the user is rejected because the user is registered for the emergency service.

2. The session control entity of claim 1, wherein the user identities comprise at least one of:
a public identity, and
an Internet Protocol Multimedia Subsystem public user identity.

3. The session control entity of claim 1, wherein the indication is transmitted at least one of:
responsive to the request,
in a rejection,
according to a diameter protocol, and
in Registration-Termination-Answer message.

4. The session control entity of claim 1, wherein the request comprises at least one of:
a de-registration, and
a network initiated de-registration.

5. A subscription entity, comprising:
at least one processor; and
at least one memory including computer program code, where the at least one memory and the computer program code are configured, with the at least one processor, to cause the subscription entity to at least:
transmit, to a session entity, a request to terminate a registration of a user;
receive, from the session control entity, responsive to the request, an indication indicating that the user is registered for an emergency service, wherein the indication comprises an experimental result code of an internet protocol multimedia subsystem to indicate that the request to terminate the registration of the user is rejected because the user is registered for the emergency service; and
maintain the registration of the user active based on the received indication.

6. The subscription entity of claim 5, wherein the indication is received at least one of:
responsive to the request,
in a rejection,
according to a diameter protocol, and
in Registration-Termination-Answer message.

7. The subscription entity of claim 5, wherein the request to terminate comprises a network initiated de-registration.

8. A method, comprising:
- receiving a request from a subscription entity to terminate a registration of a user, wherein the request comprises user identities;
- based on the user identities, determining a status of various registrations of the user, comprising determining that the various registrations of the user include that the user is registered for an emergency service,
- keeping the user registered for the emergency service, based on the determination the user is registered for the emergency service, and,
- terminating at least one registration relating to the user, wherein the at least one registration does not comprise the registration for the emergency service,
- transmitting an indication to the subscription entity indicating that the user is registered for an emergency service based on the determination the user is registered for the emergency service, wherein the indication comprises an experimental result code of an internet protocol multimedia subsystem to indicate that the request to terminate the registration of the user is rejected because the user is registered for the emergency service.

9. The method of claim 8, wherein the request to terminate comprises a network initiated de-registration.

10. The method of claim 8, wherein the Internet Protocol Multimedia Subsystem experimental result code is using text comprising DIAMETER_ERROR_EMERGENCY_REGISTRATION.

11. A method, comprising:
- transmitting, by a subscription entity, a request to a session control entity to terminate a registration of a user, wherein the request comprises user identities;
- receiving by the subscription entity, from the session control entity responsive to the request an indication indicating that the user is registered for an emergency service, wherein the indication comprises an experimental result code of an internet protocol multimedia subsystem to indicate that the request to terminate the registration of the user is rejected because the user is registered for the emergency service; and
- maintaining the registration of the user active based on the received indication.

12. A non-transitory computer readable medium comprising computer program code when executed by a processor adapted to produce the steps of claim 8.

* * * * *